United States Patent [19]
Benham, Jr. et al.

[11] Patent Number: 4,515,451
[45] Date of Patent: May 7, 1985

[54] INDEXING MICROFILM

[75] Inventors: Harold H. Benham, Jr., Timonium, Md.; Thomas R. Wells, Des Plaines, Ill.

[73] Assignee: Bell & Howell Company, Chicago, Ill.

[21] Appl. No.: 498,619

[22] Filed: May 27, 1983

[51] Int. Cl.$^3$ .............................................. G03B 23/08
[52] U.S. Cl. .................................... 353/120; 353/27 R
[58] Field of Search ................. 353/120, 27 R, 22-24

[56] References Cited

U.S. PATENT DOCUMENTS

| | | | |
|---|---|---|---|
| 2,705,436 | 2/1955 | Bradner | 353/27 R |
| 3,269,261 | 8/1966 | Porter | 353/103 X |
| 3,754,817 | 8/1973 | Iida et al. | 353/27 A |
| 3,980,401 | 9/1976 | Holliday | 353/120 R |
| 4,245,898 | 1/1981 | Hall | 353/27 R |

FOREIGN PATENT DOCUMENTS 2935213 3/1981 Fed. Rep. of Germany .... 353/27 R

OTHER PUBLICATIONS

IBM Tech. Bulletin, "Projection Display Split Screen" Baldauf et al., vol. 22, #3, 8/79.

Primary Examiner—Harry N. Haroian
Attorney, Agent, or Firm—Neal C. Johnson; Alan H. Haggard; Alan B. Samlan

[57] ABSTRACT

A microfilm card adapted to be used with a microfilm reading device. The card has an image area having a plurality of images arranged in rows and columns, at least one of the images containing an expanded index of the location of the images. An index area adjacent to the image area contains a plurality of indexes thereon, with the index area precisely and accurately positioned with respect to the image area. The indexes relate to their respective expanded index on the image area, the index viewable directly by the operator. There are means on the microfilm reader which interface with the microfilm card to position the card in the reader in the same precise location each time it is to be viewed.

9 Claims, 4 Drawing Figures

INDEXING MICROFILM

BACKGROUND AND SUMMARY OF THE INVENTION

This invention relates to microfilm information systems and more particularly to an improved microfilm information system utilizing an improved microfilm card and microfilm reader.

In the past there have been various types of information storage arrangements in which images have been reduced in size and recorded on microfilm. In one common application, the images are arranged in vertical columns and horizontal rows on a microfiche card, commonly referred to as a fiche. These fiche are normally four inches by six inches and have a title block area along the top of the fiche. In a typical microfilm reading apparatus, the fiche is held by means of a carriage which is movable in two horizontal directions in the focal plane of a projection lens. Each image is capable of being projected to a convenient viewing surface or screen. The fiche is usually inserted and removed manually from the carriage and multiple image frames must normally be searched until the desired subject matter is found. Some microfilm readers utilize an index pointer attached to the carriage and an index grid on the microfilm reader to aid the user in positioning the carriage so that a preselected frame can be quickly placed in the projection path. However, such index pointers are frequently not accurately positioned with respect to the microfilm or the index grid. This results in an image being projected on the viewing screen which does not correspond to the location on the index grid indicated by the index pointer. Due to these inaccuracies they are therefore infrequently used.

While microfilm storage arrangements of the prior art have reduced the storage volume requirements for large volumes of information, they do not fully satisfy the need for rapid retrieval of the information stored on microfilm. Generally, the information is stored on the microfilm by recording a large number of documents simultaneously, or recording the documents in the order in which they are received from an information source. The information is then retrieved from the microfilm by spot scanning the images or by scanning the images in the sequence of recording until the desired information is located and displayed. Obviously, this retrieval technique is undesireable as it requires the operator to scan through large bodies of stored information before the desired information is located. In the case of microfilm cards or fiche, the access time in locating a desired image is substantial as the operator must scan the fiche in both horizontal directions. The use of an index pointer used in association with a location grid does not substantially reduce the searching time as the pointer and grid are usually not in registration with the fiche. The need therefore exists for a means to rapidly retrieve information stored on microfiche. This is particularly true in the case of large amounts of information stored on numerous microfiche.

The device in U.S. Pat. No. 3,797,925 illustrates a microfiche reader having an indicating grid. A cursor indicates the frame of the fiche card which is in the projection position. However, there is not any positive registration between the fiche card and the indicating grid which guarantees the indicating grid is in registration with the fiche or image projected. The grid is fixed and the movement of the cursor is dependent on movement of the fiche carriage which gives a visual indication of location on the grid. There is not any fiche positioning device to accurately position the fiche on the fiche carriage to guarantee the fiche is in its proper position each time it is to be read. Furthermore, there is not any positive registration between the image and the grid.

In U.S. Pat. No. 3,822,090, similar problems are encountered. The grid is not connected to nor does it necessarily relate to the image projected. The index is not integral with the images on the fiche. Furthermore, there is no accurate registration between images and the fiche index, which is further complicated by the use of a pantograph.

In U.S. Pat. No. 3,885,567, the same or similar shortcomings are experienced as in the two previously cited references. There is again no registration between the grid index and the images as only an illuminating light is projected onto the grid to indicate the image location being projected.

A film card having reference frames which can be used for positioning of a raster pattern on the remaining frames is illustrated in U.S. Pat. No. 4,225,217. The reference frame only includes a marker image. However, this device does not use an index grid in conjunction and affixed to the microfilm images. Thus, the operator does not have a corresponding image for which he is searching by merely viewing the index grid.

U.S. Pat. No. 3,868,179, illustrates a microform positioning device having a plate member of microfilm carriage which has a series of aligned projections which cooperate with recesses which are part of the reader. This enables the microfilm carriage to be incremented in discreet incremental movements which are designed to correspond with the rows of images on the microfilm. However, the microfiche does not integrate corresponding operator viewable index images with the microfilm images.

One other microform information storage unit is disclosed in related U.S. Pat. Nos. 3,980,401 and 3,980,402. The microfilm information storage unit has an information storage area and an index area, both affixed to a sheet by means of an adhesive. However, the index images are not directly operator viewable and do not correspond to an expanded image index. Furthermore, there is not any means to align or position the microfilm storage unit into the reader such that it is positioned in the reader in the same exact location each time.

The inventive device described herein has a microfilm card which has both an image area and an index area which is adjacent to the image area. The index area is precisely and accurately positioned with respect to the image area. There are operator viewable indexes on the index area which allow the operator to easily and quickly locate the general subject which is being searched for. By properly positioning the index in the microfilm reader, an expanded index is projected from the image area onto the microfilm reader's screen. The expanded index gives the operator the exact location in the row of micro images at which the desired information can be found. The microfilm card has tabs or projections extending from the side of the card which interface with posts on the microfilm reader such that the card is accurately and positively positioned in the microfilm reader each time it is to be viewed.

Thus, it is an object of this invention to provide a new and improved microfilm card. It is a further object to provide a microfilm card which is adapted to be used with a microfilm reading device wherein the card has tabs or projections which interface with the microfilm reader to accurately position the card in the reader. A related object is to provide a microfilm card which uses the projections on the card to hang the card from a rack storage device for convenient filing and storage. The projections can further be used to place filing information thereon.

Another object is to provide an information retrieval system wherein a microfilm card has an operator viewable index which can be used to quickly locate the general subject matter being searched and project on the microfilm reader's screen an expanded index directed to the specific information sought.

Other objects and advantages will become apparent on reading the following brief description of the drawings and description of the preferred embodiment.

BRIEF DESCRIPTION OF THE DRAWINGS

FIG. 4 is a view of the information projected on the microfilm readers screen which is representative of an expanded index.

DESCRIPTION OF THE PREFERRED EMBODIMENT

Figure 1:
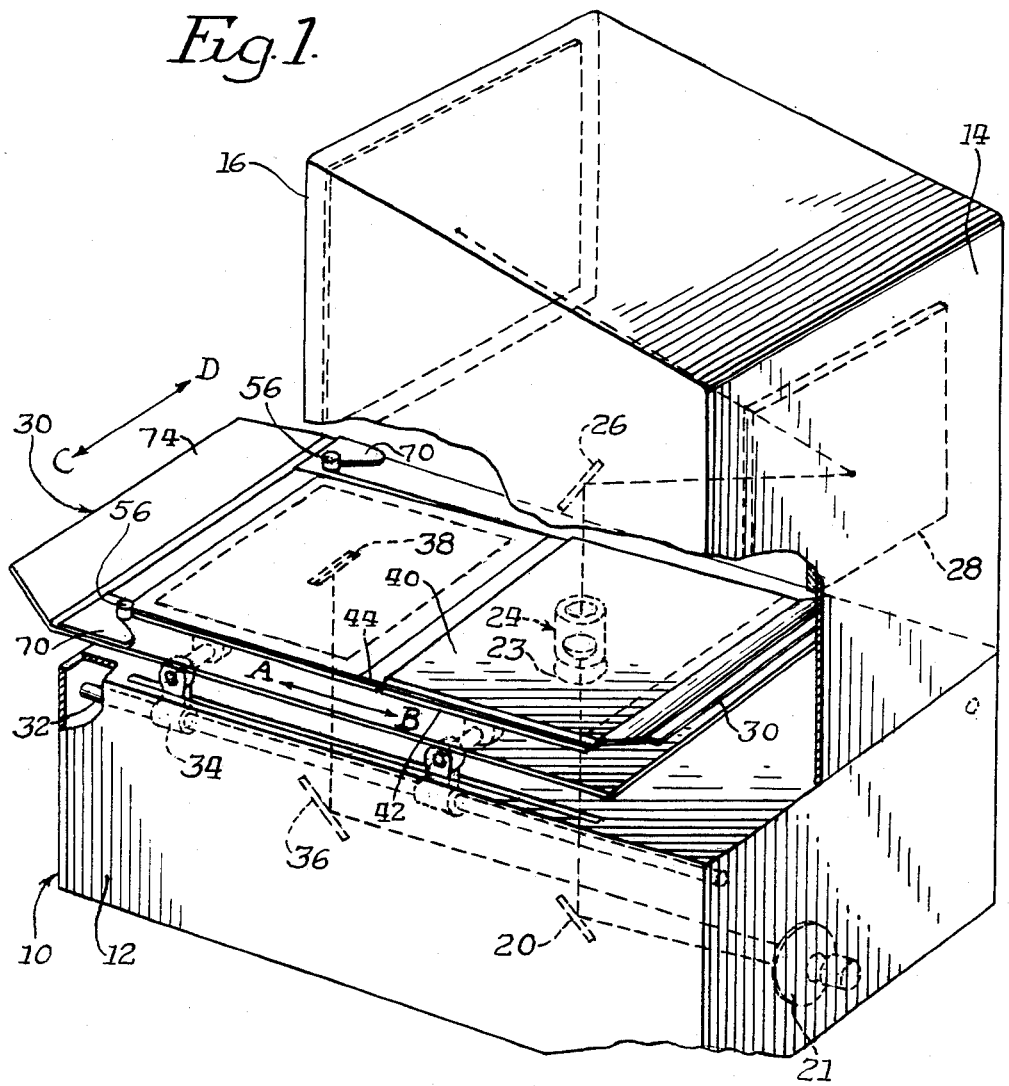
FIG. 1 is a cross-sectional view of a microfilm reader having an elongated fiche carriage to receive the inventive microfilm card.

Turning first to FIG. 1 there is illustrated a microfilm reader 10 having a base 12 and a hood 14. At the front of the hood 14 is a screen 16 on which individual images 18 are projected from a microfilm card 20 for viewing by the operator.

The projection system of the microfilm reader 10 is of standard design and is seen to comprise a lamp 21 projecting a beam of light which is reflected off a mirror 22. The light beam then passes through an aperture 23 in the base 12. A projection lens 24 which has focusing provisions (not illustrated) projects the image 18 against a first mirror 26 located in the hood 14. The image 18 is then projected against a second mirror 28 which then reflects it for viewing on the screen 16.

A microfiche carriage 30 is used to retain the microfilm 20 in a flat plane relative to the projection lens 24 and further provides for movement of the microfilm 20 to allow selected images to be placed in the projection path for viewing on the screen 16. The carriage 30 is movable in the horizontal directions indicated by the arrows A-B and C-D. Movement in the direction of arrow A-B is accomplished by means of a rod 32 which extends underneath the top surface of the base 12. Collar-like members 34 are attached to the carriage 30 and encircle the rods 32. These allow sliding movement of the carriage in the direction of the arrows A-B. A similar device or bearing assemblies commonly known and available in the art, provide movement of the carriage 30 in the direction of the arrows C-D. Thus, image selection can be obtained by movement of the carriage 30 with respect to the light path projected from the mirror 30 to the aperture 23 and into the balance of the projection system within the hood 14.

However, the reader 10 varies with respect to readers of the prior art. Particularly, the base 12 is extended forward in the direction of the viewer. There is included a second base mirror 36 which reflects light from the lamp 18 upwards through a second aperture 38, in the form of a thin slit, or a circular hole, located in the top of the base 12.

Figures 2, 3:
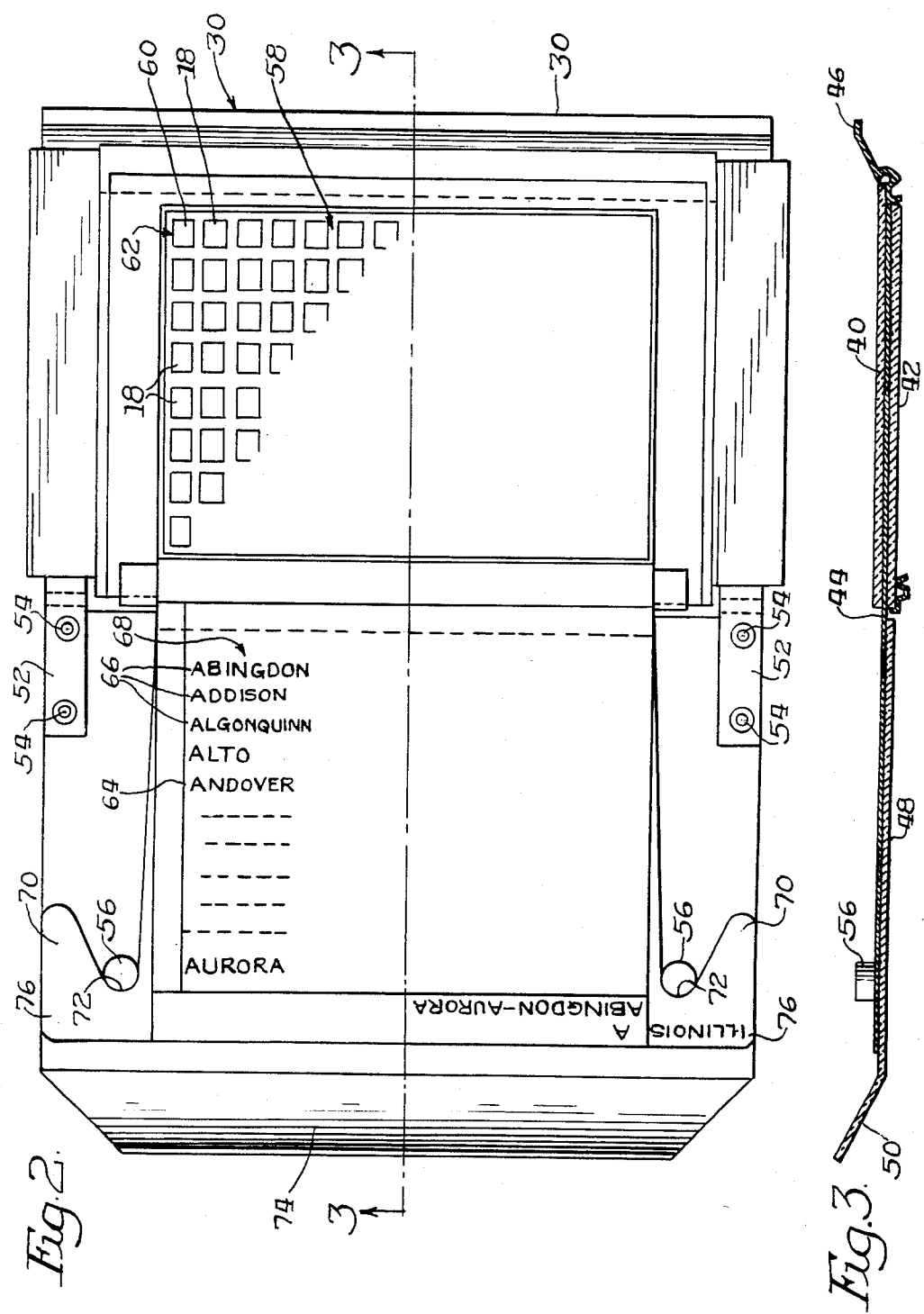
FIG. 2 is a top view of the fiche carriage and the inventive fiche.
FIG. 3 is a cross-sectional view taken along line 3—3 of FIG. 2.

The microfiche carriage 30 can best be seen in FIGS. 2 and 3. Top and bottom glass flats 40, 42, respectively, retain the microfilm card 20 between them such that the images 18 on the microfilm card 20 remain in a fixed plane relative to the projection system. This enables all images to remain in focus across the entire microfilm card 20. Automatic opening of the glass flats is accomplished when the carriage 30 is pulled to its extreme forward-most position by a projecting arm 46 extending from the rear of the carriage 30 striking a fixed point on the reader frame. This causes the top glass flat 40 to pivot upward enabling easy withdrawl and replacement of the microfilm cards 20.

Extending from the front of the glass flats is a transparent or translucent extension support 48. At the front of the extension support 48 is an operator grasping portion 50 which the operator uses to move the microfiche carriage 30. The extension support 48 is connected to the microfiche carriage 30 by means of a connecting brace 52 located on either side of the microfiche carriage 30. The connecting braces 52 can be connected by means of screws 54 which securely hold the extension support 48 to form an integral part of the carriage 30. In this manner, existing carriages can be modified to accept the microfilm card 44. Alternatively, the extension support 48 could be manufactured as an integral unit with the microfiche carriage 30.

Positioned towards the front of the extension support 48 are two locating posts 56, firmly attached to the extension support 48. The position of the posts 56 is critical as they provide reference points so that the microfilm card 44 will be properly positioned with respect to the microfilm reader 10 and its internal projection system.

The microfilm card 20 is unique and presents a new form of micro imaging. As seen in FIG. 2, the card 20 has a microfilm image area 58 which contains the plurality of information bearing images 18 arranged in rows and columns. One of the micro images 18 in the micro image area 58, may be an expanded index image 60 of the locations of some of the images on the image area. There may be several expanded indexes 60 but they are preferably arranged in a vertical column 62 along one edge of the micro image area 58. The micro image area 58 is located at the back of the microfilm card 20 which is the portion of the card retained between the top and bottom glass flats 40, 42. This part of the film carriage 30 moves in the projection light beam to project the micro images 18 or the index image 60 onto the screen 16. Thus, by movement of the carriage 30, various micro images can be placed under the lens 24 for viewing.

The front part of the microfilm card 44 has an index area 64 which contains indexes 66. The indexes 66 are viewable directly by the operator without the need of auxiliary apparatus or projection of the indexes onto a screen. It can be seen that the indexes 66 are also preferably arranged in a vertical column 68 which is along one edge of the index area 64. In order for the indexes 66 to be easily read by the operator, the second aperture 38 projects an appropriately sized beam of light upward through it. As the index area 64 is translucent, the index selected is illuminated for easy viewing. In an alternate configuration, the indexes can be arranged in horizontal rows or as a combination of horizontal and vertical indexes. In the configuration chosen, the selected index 66 is illuminated by the light passing through the aperture 38 and the correspsonding images projected.

Extending from either side of the index area 64 are positioning tabs 70 which are integral with the index area 64. These positioning tabs 70 may be reinforced if necessary with respect to the material from which the index area is made. Tabs 70 have a curved lower portion 72 which provides a reference location to interface with the posts 56. The distance between the posts 56 is equal to the distance between the curved portions 72. The contour of the posts 56 is designed to substantially follow the curved lower portion 72. Other positioning means would be readily apparent such as tabs or slots on the microfilm card 20 which would interface with a fixed location on the fiche carriage 30. The important point is that the microfilm card 20 is retained on the fiche carriage in the same precise location each time it is placed in the reader 10 for viewing.

Along the front of the microfilm card 20 is a title area 74 on which various types of information can be placed. The information would aid in filing the microfilm cards 20 in a selected alphabetical or numeric sequence for easy retrieval. Additional filing information can be placed on the tab 70 as desired.

The use of applicant's invention can best be illustrated by way of example. If the operator desired to find the Zip Code for Bayview Street in Alton, Ill., he would first go to a tray of microfilm cards 20 which contain the Zip Codes for the entire United States. The cards are stored vertically by having them hanging from parallel rods which support the cards by the lower portions 72 such that the tabs 70 are at the top of the tray. On one tab 72 of each card, the states, such as shown as 76 in FIG. 2 would be printed. The operator pulls out the microfilm card 44 which has Illinois on the positioning tab 70. The card 44 is then inserted onto the fiche carriage 30 until it is in proper position with the lower portions 72 against the locating posts 56. The microfilm reader is turned on and the microfiche carriage 30 is pushed all the way to the left so that the light from the second aperture 38 is projected up through the vertical column of indexes 68. The operator then looks for Alton to be illuminated by the aperture 38. In this position, the appropriate expanded index 60 is projected on the screen as illustrated in FIG. 3. This provides an expanded index for the town of Alton and the individual street can be selected. The operator looks under Alton until he finds the street he is searching for. Adjacent Bayview he is instructed to move the microfiche carriage 30 to column two. The operator moves the carriage to column two and the image projected would be the various addresses on Bayview with appropriate Zip Codes listed. Thus, an easy step-by-step procedure is followed to obtain the Zip Code for any street in the United States.

It can be seen that the registration between the indexes 66 and their respective expanded index 60 is critical for the system to be operative. Thus, for each index 66, there is an expanded index 60 which is projected on the screen 16. Furthermore, the expanded index 60 must be precisely positioned with respect to the location of its respective index 66 so that when the operator is looking at the index 66 (which is being illuminated by means of the slit 38) the appropriate expanded index 60 is being projected on the screen 16 for viewing. In order to properly assure registration between the index 66 and its expanded index 60, the microfilm card 20 can be manufactured of one piece photoplastic or photographic material. This would eliminate the need for splicing together the micro image area 58 with the index area 64. However, either method will work as long as the two areas are properly aligned and registered.

Thus it is apparent that there has been provided, in accordance with the invention, a microfilm card and information retrieval system that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A microfilm card adapted to be used with a microfilm reading device, the card comprising:
    an image area containing a plurality of images arranged in rows and columns, at least one of the images containing an expanded index of the images on the image area,
    a translucent index area adjacent to the image area containing indexes thereon,
    the index area precisely and accurately positioned with respect to the image area,
    the indexes relating to their respective expanded index on the image area and viewable directly by a person using the device without the need for magnifying or projecting on a screen the index while the related expanded index is viewable on the reading device, and
    a pair of tab members extending outward from the card, the tab members adapted to be received by upstanding locating pins on the microfilm reading device, whereby the tab members and the upstanding locating pins cooperate to accurately and positively position the microfilm card in the same precise location each time it is to be viewed.

2. The microfilm card of claim 1 wherein with respect to the microfilm reading device, the image area is placed at a rear portion on the card and the index area is placed at a front portion on the card.

3. The microfilm card of claim 1 wherein the pair of tab members are further adapted to be received by a pair of parallel, horizontal, spaced apart rails, each rail receiving one of the tab members so that the cards can be hung from the rails in a vertical position for storage.

4. The microfilm card of claim 4 wherein the indexes are all positioned in a column along an edge of the card.

5. An information retrieval system comprising:
    a microfilm card having an image area containing a plurality of images arranged in rows and columns, at least one of the images containing an expanded index specifying the location of the images on the image area, and a translucent index area adjacent to the image area containing indexes thereon, the index area precisely and accurately positioned with respect to the image area,
    the indexes relating to their respective expanded indexes on the image area,
    a microfilm reader having an operator viewable screen and projection means to project the images onto the screen, a microfilm carriage to support the microfilm card and to provide a means for moving the card with respect to the projection means to provide image selection, means to accurately and positively position the microfilm card in the microfilm reader such that the microfilm card is placed in the same precise location each time it is to be viewed, a light beam passing through the translucent index area indicating the index selected by illuminating the same, the indexes viewable directly by a person using the microfilm reader without the need for magnifying or projecting on the screen the index selected, while the related expanded index is viewable on the screen.

6. The information retrieval system of claim 5 wherein the microfilm reader has a front side and a rear side, the front being the side closest the operator, and the image area on the microfilm card placed at the rear of the card and the index area placed at the front of the card.

7. The information retrieval system of claim 6 wherein the means to accurately and positively position the microfilm card comprises a pair of tab members extending outward from the card, the tab members received by upstanding locating pins on the microfilm reader, whereby the tab members and upstanding pins cooperate with each other to position the card.

8. The information retrieval system of claim 7 wherein the indexes are all positioned in a column along an edge of the microfilm card.

9. The information and retrieval system of claim 7 wherein the pair of tab members are further adapted to be received by a pair of parallel, horizontal, spaced apart rails, each rail receiving one of the tab members so that the cards can be hung from the rails in a vertical position for storage.

* * * * *